United States Patent [19]

Koves

[11] Patent Number: 4,977,119

[45] Date of Patent: Dec. 11, 1990

[54] METHOD OF REGENERATING HYDROCARBON CONVERSION CATALYST BY COKE BURNING

[75] Inventor: William J. Koves, Hoffman Estates, Ill.

[73] Assignee: UOP, Des Plaines, Ill.

[21] Appl. No.: 437,233

[22] Filed: Nov. 16, 1989

Related U.S. Application Data

[62] Division of Ser. No. 116,932, Nov. 4, 1987, Pat. No. 4,880,604.

[51] Int. Cl.⁵ .......................... B01J 38/24; B01J 27/32; B01J 23/96; C10G 35/12
[52] U.S. Cl. ...................................... 502/48; 208/140; 502/37
[58] Field of Search .................................. 502/45–49, 502/37; 208/140, 146

[56] References Cited

U.S. PATENT DOCUMENTS

| | | | |
|---|---|---|---|
| 2,671,057 | 3/1954 | McLure | 502/48 |
| 3,027,244 | 3/1962 | Byrne et al. | 208/146 |
| 3,652,231 | 3/1972 | Greenwood et al. | 208/140 |
| 3,706,536 | 12/1972 | Greenwood et al. | 208/140 |
| 4,859,643 | 8/1989 | Sechrist et al. | 502/48 |
| 4,880,604 | 11/1989 | Koues et al. | 208/140 |

Primary Examiner—Paul E. Konopka
Attorney, Agent, or Firm—Thomas K. McBride; John G. Tolomei

[57] ABSTRACT

Method and apparatus for effecting treatment needed to regenerate spent hydrocarbon conversion catalyst. The invention may be termed a variable gas flow catalyst bed. Catalyst particles in a vertically-elongated movable bed are contacted with a hot oxygen-containing gas stream in order to remove, by means of combustion, coke which accumulated on the catalyst particles while they were used in a hydrocarbon conversion zone. The catalyst particles are confined in the bed by means of catalyst retention screens. The catalyst retention screens are configured such that gas flow through the bed varies from a maximum at the top of the bed to a minimum at the bottom of the bed. The variation in gas flow is accomplished by varying the size of gas flow apertures in the retention screens from a maximum at the top of the bed to a minimum at the bottom of the bed. The varying gas flow pattern results in the delivery of oxygen in a manner which more closely matches the oxygen requirement for combustion at each point in the bed, thus increasing the coke burning capacity of the bed. Catalyst reforming is an example of a hydrocarbon conversion process in which the invention may be advantageously employed.

10 Claims, 5 Drawing Sheets

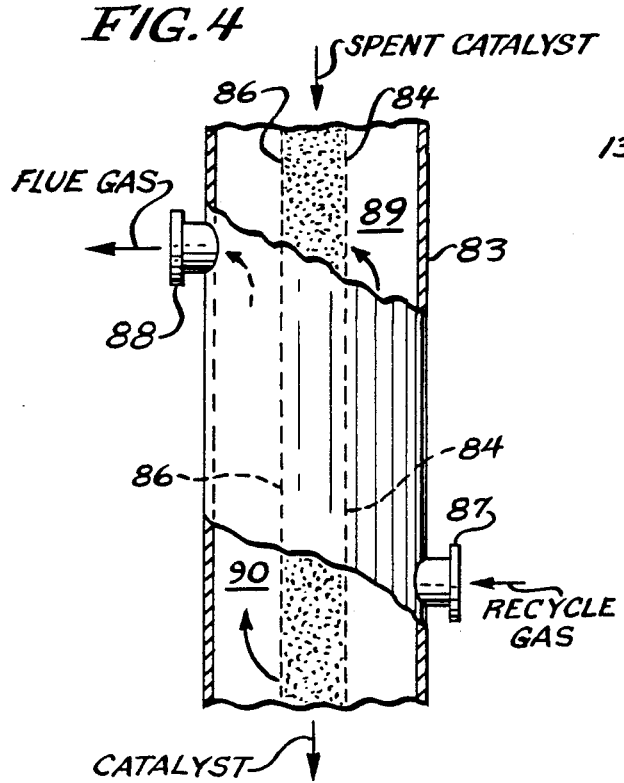
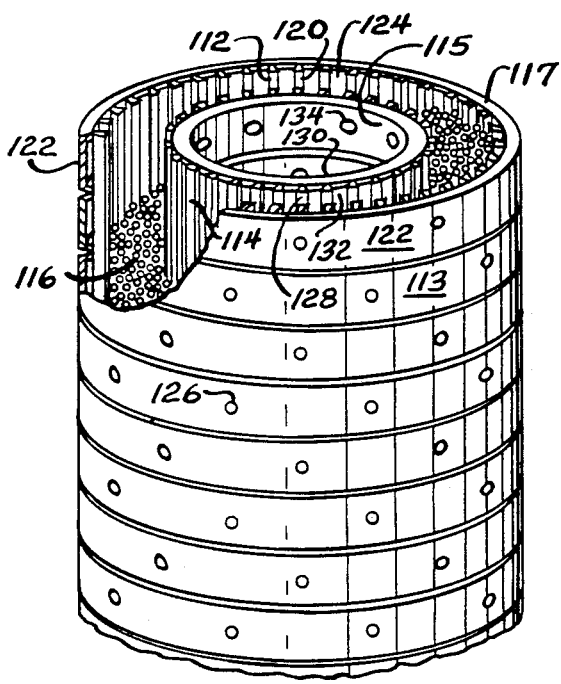
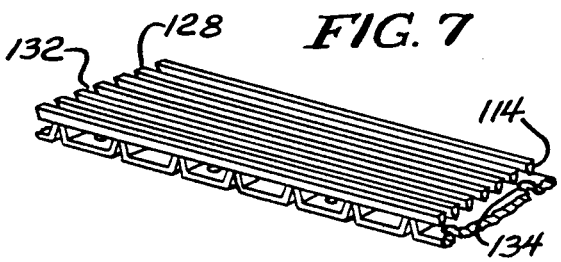
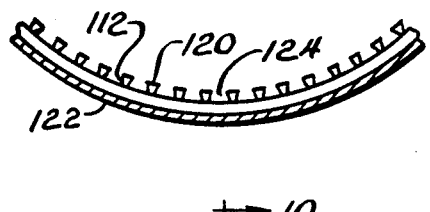
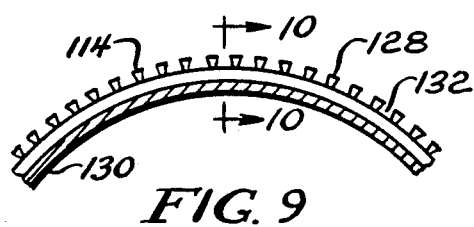
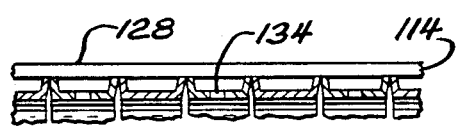
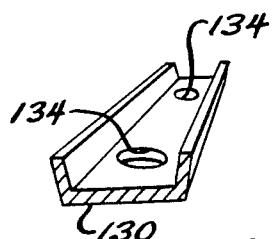

METHOD OF REGENERATING HYDROCARBON CONVERSION CATALYST BY COKE BURNING

This application is a divisional application of Ser. No. 116,932 filed Nov. 4, 1987, and now U.S. Pat. No. 4,880,604, issued Nov. 14, 1989.

FIELD OF THE INVENTION

This invention relates to the art of catalytic conversion of hydrocarbons to useful hydrocarbon products. More specifically, it relates to the reconditioning of spent hydrocarbon conversion catalyst so that the catalyst can be reused in a hydrocarbon conversion reaction.

BRIEF SUMMARY OF THE INVENTION

The present invention is a method for effecting treatment needed to regenerate spent hydrocarbon conversion catalyst. The invention may be termed a variable gas flow catalyst bed.

Catalyst particles in a vertically-elongated movable bed are contacted with a hot oxygen-containing gas stream in order to remove, by means of combustion, coke which accumulated on the catalyst particles while they were used in a hydrocarbon conversion zone. Substantially all of the catalyst in the bed is in contact with the flowing gas. The catalyst particles are confined in the bed by means of catalyst retention screens, through which catalyst cannot pass. Catalyst in the bed moves downward under the influence of gravity. Gas passes through the catalyst bed in a direction which is substantially transverse to the direction of catalyst movement. Bed thickness in the direction of gas flow is uniform.

The catalyst retention screens are configured such that the gas flow through the bed varies from a maximum flow at the top of the bed to a minimum flow at the bottom of the bed. This is in contrast to previous regenerator configurations which may be termed constant flow beds, where gas flow through the bed is uniform throughout the length of the bed. The variation in gas flow is accomplished by varying the size of gas flow apertures, or holes, in the catalyst retention screens from a maximum size at the top of the bed to a minimum size at the bottom of the bed. The varying gas flow pattern results in the delivery of oxygen to the catalyst in a manner which, compared to a constant flow bed, more closely matches the oxygen requirement for combustion at each point in the bed, thus increasing the coke burning capacity of the bed. Catalystic reforming is an example of a hydrocarbon conversion process in which the invention may be advantageously employed. After the coke is burned off, catalyst may be treated in a halogenation zone, which is comprised of a downwardly extended portion of the catalyst bed.

In a commonly-used regeneration method, at least a portion of the treatment steps needed to regenerate spent hydrocarbon conversion catalyst take place in a vessel which is commonly called a regenerator, or regeneration vessel. Spent catalyst may be termed deactivated or used catalyst. Reactivation of catalyst refers to full or partial reactivation of the catalyst such that it may be used again to promote a reaction.

Practice of the invention offers a number of advantages over the use of a constant flow bed. Modification of a constant flow regenerator in accordance with the invention will provide an increase in the allowable rate of coke burning that is, an increase in regenerator capacity, as compared to an unmodified regenerator. This increase is available at a relatively low cost, compared with other methods of increasing capacity. Also, both capital and operating costs are reduced in comparison with other method of increasing capacity. With additional regenerator capacity available, the hydrocarbon conversion process may be operated at an increased severity and/or an increased rate. Practice of the invention thus provides an increased amount and/or quality of hydrocarbon products.

It is an object of this invention to increase the coke removal capacity of hydrocarbon conversion catalyst regeneration vessels.

It is also an object of this invention to increase the quantity and/or quality of hydrocarbon products produced in the hydrocarbon conversion zone utilizing catalyst regenerated in accordance with this invention.

It is also an object of this invention to effect savings in capital cost and operating cost of hydrocarbon conversion catalyst regeneration units.

In a broad embodiment, the invention comprises a burn zone used in regenerating spent hydrocarbon conversion catalyst which is comprised of a vessel which contains a vertically-elongated bed of catalyst particles through which a gas may flow in a horizontal direction, which is arranged so that catalyst particles may flow downward within the bed by gravity, said catalyst bed having a uniform thickness dimension which is transverse to the direction of catalyst movement; means for adding catalyst particles to the top of said catalyst bed; means for withdrawing catalyst particles from the bottom of said catalyst bed; a space within said vessel for distributing a recycle gas such that it may flow through the bed of catalyst in a direction which is transverse to the direction of catalyst movement and corresponds to said uniform bed thickness, where said recycle gas is comprised of oxygen for use in combustion of coke; a space within said vessel for collecting flue gas, which is comprised of gas which has passed through the catalyst bed; means for supplying air to said flue gas collection space, so that said air mixes with said flue gas to form recycle gas; means for supplying recycle gas to said recycle gas distribution space; and, catalyst retention screens having gas flow apertures, said screens being arranged to confine catalyst particles to form said catalyst bed, where said gas flow apertures in at least a portion of said screens vary from a maximum size at the top of said catalyst bed to a minimum size at the bottom of said catalyst bed, thereby causing the gas flow rate through the bed to vary from a maximum at the top of the bed to a minimum at the bottom of the bed.

In a particular embodiment, the screen for confining the catalyst to form the bed may be further characterized as being comprised of a vertical cylindrical outer catalyst retention screen and a vertical cylindrical inner catalyst retention screen, which screens extend substantially throughout said burn zone, which screens are concentric with one another to retain said bed of catalyst between said inner screen and said outer screen, which outer screen is concentrically disposed in said vessel to form said space for distributing recycle gas between the vessel sidewall and the outer screen, and which inner screen encloses a central space which comprises said space for collecting flue gas.

When a catalyst must be halogenated as a part of the regeneration process, the invention further comprises a catalyst halogenation zone which is comprised of a downwardly extended portion of the regeneration vessel and the catalyst retention screens and is further comprised of a halogenation gas distribution space formed between the outer screen and the vessel sidewall which is adjacent to said recycle gas distribution space; a horizontal partition ring located in said halogenation gas distribution space and extending between the vessel sidewall and the outer screen to form an upper boundary of said halogenation gas distribution space, where said partition ring forms a lower boundary of said recycle gas distribution space and substantially prevents gas flow between the halogenation zone gas distribution space and said recycle gas distribution space; at least one halogen inlet nozzle on said vessel which communicates with said halogenation gas distribution space; a halogenation gas collection space, which is comprised of the central space enclosed by said inner screen; at least one halogen outlet nozzle and at least one halogen outlet conduit which is in communication with said halogen outlet nozzle and also in communication with said halogenation gas collection space; gas collection and diversion means, which are located at the upward in said central space in the halogenation zone into said halogen outlet conduit and to direct a second portion of gas flowing upward in the halogenation zone into said burn zone; a bottom closure for said halogenation gas collection space; and, a necked-down portion of said vessel sidewall which comprises a lower boundary of said halogenation gas distribution space.

In method terms, a broad embodiment of the invention comprises the steps of passing spent catalyst particles into the top of a vertically-elongated bed of catalyst particles, which bed is of uniform thickness, said catalyst particles being confined to form said bed by catalyst retention screens having gas flow apertures through which a gas may pass; withdrawing catalyst particles from the bottom of the catalyst bed, thereby causing catalyst particles to move downward by gravity; maintaining the bed of catalyst particles at coke-oxidizing temperatures; and, passing a gas comprising oxygen for use in combustion of coke through the catalyst bed in a non-uniform manner such that the gas flow rate varies from a maximum at the top of the bed to a minimum at the bottom of the bed, where the direction of gas flow is substantially transverse to the direction in which catalyst moves, where substantially all of the catalyst in the bed is in contact with flowing gas, and where said gas flow apertures in at least a portion of said screens vary from a maximum size at the top of said catalyst bed to a minimum size at the bottom of said catalyst bed in order to cause said variation in gas flow rate.

INFORMATION DISCLOSURE

U.S. Pat. No. 3,652,231 (Greenwood et al.) shows regeneration apparatus in which a constant-width movable bed of catalyst is utilized. U.S. Pat. No. 3,652,231 also describes a continuous catalyst regeneration process which is used in conjunction with catalytic reforming of hydrocarbons. U.S. Pat. Nos. 3,647,680 (Greenwood et al.) and 3,692,496 (Greenwood et al.) also deal with regeneration of reforming catalyst. These patents ('231, '680, and '496) are hereby incorporated in full into this patent application.

U.S. Pat. No. 3,027,244 issued to Byrne et al. shows the use of a nonuniform distribution of gas flow apertures in a radial flow bed in order to obtain a uniform gas flow therethrough.

U.S. Pat. Nos. 2,046,458 (Johnson, 4,906,911 (Geske), and 4,276,265 (Gillespie) show several types of screen which may be used to confine catalyst particles in the bed.

U.S. Pat. No. 3,838,038 lists exemplary hydrocarbon conversion processes with which moving bed regeneration apparatus may be used (column 6); the list includes hydrocracking and other hydroprocessing applications, isomerization, alkylation, and dehydrogenation.

In U.S. Pat. No. 3,978,150 (McWilliams), which discloses a process for catalytic dehydrogenation of saturated normal paraffins, especially those having two to six carbon atoms per molecule, a catalyst which may be regenerated in apparatus designed in accordance with '231 is used, though the halogenation section is not required (see column 7). Additional examples of dehydrogenation catalysts which may be regenerated using the apparatus of the present invention may be seen in U.S. Pat. Nos. 4,438,288 (Imai et al.) and 4,506,032 (Imai et al.).

U.S. Pat. No. 3,745,112 (Rausch) discloses a catalyst of broad utility which is preferably regenerated by means of a moving bed process which may be practiced in apparatus of the present invention.

BACKGROUND OF THE INVENTION

The present invention is applicable to a number of hydrocarbon conversion processes which utilize a catalyst. For example, it is useful in the isomerization of normal butane to isobutane and the isomerization of mixed $C_8$ aromatics, including those of high ethylbenzene content, to meta-xylene or para-xylene. The present invention may also be used in upgrading light straight run naphtha, which is a mixture rich in $C_5$ and $C_6$ paraffins (pentanes and hexanes), to the corresponding branched isomer, which have higher octane numbers than the feed naphtha. Another hydrocarbon conversion process in which the present invention may be used is dehydrogenation of light paraffins ($C_2$ through $C_5$, but primarily $C_3$ and $C_4$) to the corresponding olefins.

However, the most widely practiced hydrocarbon conversion process to which the present invention is applicable is catalytic reforming. Therefore, the discussion of the invention contained herein will be in reference to its application to a catalytic reforming reaction system. It is not intended that such discussion limit the scope of the invention as set forth in the claims.

Catalytic reforming is a well-established hydrocarbon conversion process employed in the petroleum refining industry for improving the octane quality of hydrocarbon feedstocks, the primary product of reforming being motor gasoline. The art of catalytic reforming is well known and does not require detailed description herein.

Briefly, in catalytic reforming, a feedstock is admixed with a recycle stream comprising hydrogen and contacted with catalyst in a reaction zone. The usual feedstock for catalytic reforming is a petroleum fraction known as naphtha and having an initial boiling point of about 180° F. (355K) and an end boiling point of about 400° F. (477K). The catalytic reforming process is particularly applicable to the treatment of straight run gasolines comprised of relatively large concentrations of naphthenic and substantially straight chain paraffinic hydrocarbons, which are subject to aromatization through dehydrogenation and/or cyclization reactions.

Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerizaton of alkylcycloparaffins to yield cyclohexanes, isomerization of substituted aromatics, and hydrocracking of paraffins. Further information on reforming processes may be found in, for example, U.S. Pat. Nos. 4,119,526 (Peters et al.); 4,409,095 (Peters); and 4,440,626 (Winter et al.).

A catalytic reforming reaction is normally effected in the presence of catalyst particles comprised of one or more Group VIII nobel metals (e.g. platinum, iridium, rhodium, palladium) and a halogen combined with a porous carrier, such as a refractory inorganic oxide. Alumina is a commonly used carrier. The halogen is normally chlorine. The particles are usually spheroidal and have a diameter of from about 1/16th to about ⅛ inch (1.5–3.1 mm), though they may be as large as ¼th inch (6.35 mm). In a particular regenerator, however, it is desirable to use catalyst particles which fall in a relatively narrow size range. A preferred catalyst particle diameter is 1/16 inch (3.1 mm). During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be reconditioned, or regenerated, before it can be reused in a reforming process.

There are several basic process schemes. The catalyst in the reaction zone may be maintained in continuous use over an extended period of time, from about five months to about a year or more, depending on the quality of the catalyst and the nature of the feedstock. Following the extended period of operation the reforming reactor, or reactors, must be taken out of service while the catalyst is regenerated or replaced with fresh catalyst. Of course, this necessitates shutdown of all equipment in the reforming unit.

In another process scheme for reforming, known as the swing reactor method, catalyst is regenerated with greater frequency. A multiple fixed bed reactor system is arranged for serial flow of feedstock in such a manner that one reactor at a time can be taken off-stream while the catalyst in that reactor is regenerated or replaced with fresh catalyst. The reactor with fresh catalyst is placed on-stream when another reactor is taken off-stream for the catalyst bed to be regenerated or replaced with fresh catalyst.

In another process scheme, a moving bed reaction zone and regeneration zone are employed. The present invention is applicable to a moving bed regeneration zone. Fresh catalyst particles are fed to a reaction zone, which may be comprised of several subzones, and the particles flow through the zone by gravity. Catalyst is withdrawn from the bottom of the reaction zone and transported to a regeneration zone where a multistep process is used to recondition the catalyst to restore its full reaction promoting ability. Catalyst flows by gravity through the various regeneration steps and then is withdrawn from the regeneration zone and furnished to the reaction zone. Movement of catalyst through the zones is often referred to as continuous though, in practice, it is semi-continuous. By semi-continuous movement is meant the repeated transfer of relatively small amounts of catalyst at closely spaced points in time. For example, one batch per minute may be withdrawn from the bottom of a reaction zone and withdrawal may take one-half minute, that is, catalyst will flow for one-half-minute. If the inventory in the reaction zone is large, the catalyst bed may be considered to be continuously moving. This method of operation is preferred by many of those skilled in the art. When the moving bed method is used, there is no loss of production while catalyst is removed and replaced. Also, use of the moving bed method avoids the shutdown and start-up procedures of the swing reactor system relating to insertion and removal of a reactor in the process stream.

Catalytic reforming is the traditional octane controller in a refinery, that is, the catalytic reforming process is adjusted to vary the octane rating of the reformate product. For example, increasing temperature in a catalytic reforming zone results in a reformate of increased octane rating. Other hydrocarbons are blended with reformate in the production of motor gasoline, but the octane rating of the refinger motor gasoline pool is determined primarily by the octane rating of reformate.

Lead-based compounds may be added to gasoline in order to enhance octane. The government mandated reduction of lead content of "regular" gasoline and the total elimination of lead in the major portion of gasoline used in this country has caused refiners to look for method of increasing the octane rating of reformate. Higher octane reformate may be used to compensate for the reduction or total elimination of the lead-based additives used in motor gasoline for increasing octane rating. A method of increasing reformate octane rating is to increase the severity of the reaction. Increasing reaction temperature increases severity, as does lowering the pressure at which the reaction takes place. Reducing the hydrogen to hydrocarbon ratio also promotes greater severity. It should be noted that increasing the severity of the reaction results in a higher coke make, that is, a higher rate of deposition of coke on the catalyst in the reaction zone. A higher rate of coke deposition requires that catalyst regeneration be accomplished at a more rapid rate.

It can be seen that severity is an umbrella term which covers changes in a number of parameters. Severity is also a relative term and not susceptible of precise definition. Much depends upon the original design of a unit. For example, a refining process operating at higher than design temperature is often said to be operating at an increased severity. Another similar unit operating at the same temperature, but where that temperature is the design temperature, is often not considered to be operating at high severity. A change in catalyst or feedstock may induce one skilled in the art to refer to operation at increased severity. For example, in a catalytic reforming unit, a change from the normal feedstock to a thermally cracked naphtha feedstock would normally be considered to be a change to a higher severity operation. Many skilled in the art would consider operation of a catalytic reforming zone at a temperature above about 1020 degrees Fahrenheit (822K) to be a high severity process. In a like manner, operating at a pressure below 100 psig (791 kPaa) might be considered to be a high severity process.

BRIEF SUMMARY OF THE DRAWINGS

In FIG. 2, there is depicted an outer catalyst retention screen and an inner catalyst retention screen, both of which are cylindrical in form. The cutaway portions of FIG. 2 result from passing a vertical section plane along the vertical centerline of the vessel to divide the vessel in half.

FIG. 4 is a section taken in the same manner as FIG. 2 and depicts a portion of a catalyst regeneration vessel having two separate flat catalyst retention screens, which are vertically disposed opposite one another and parallel to one another.

Figure 5:
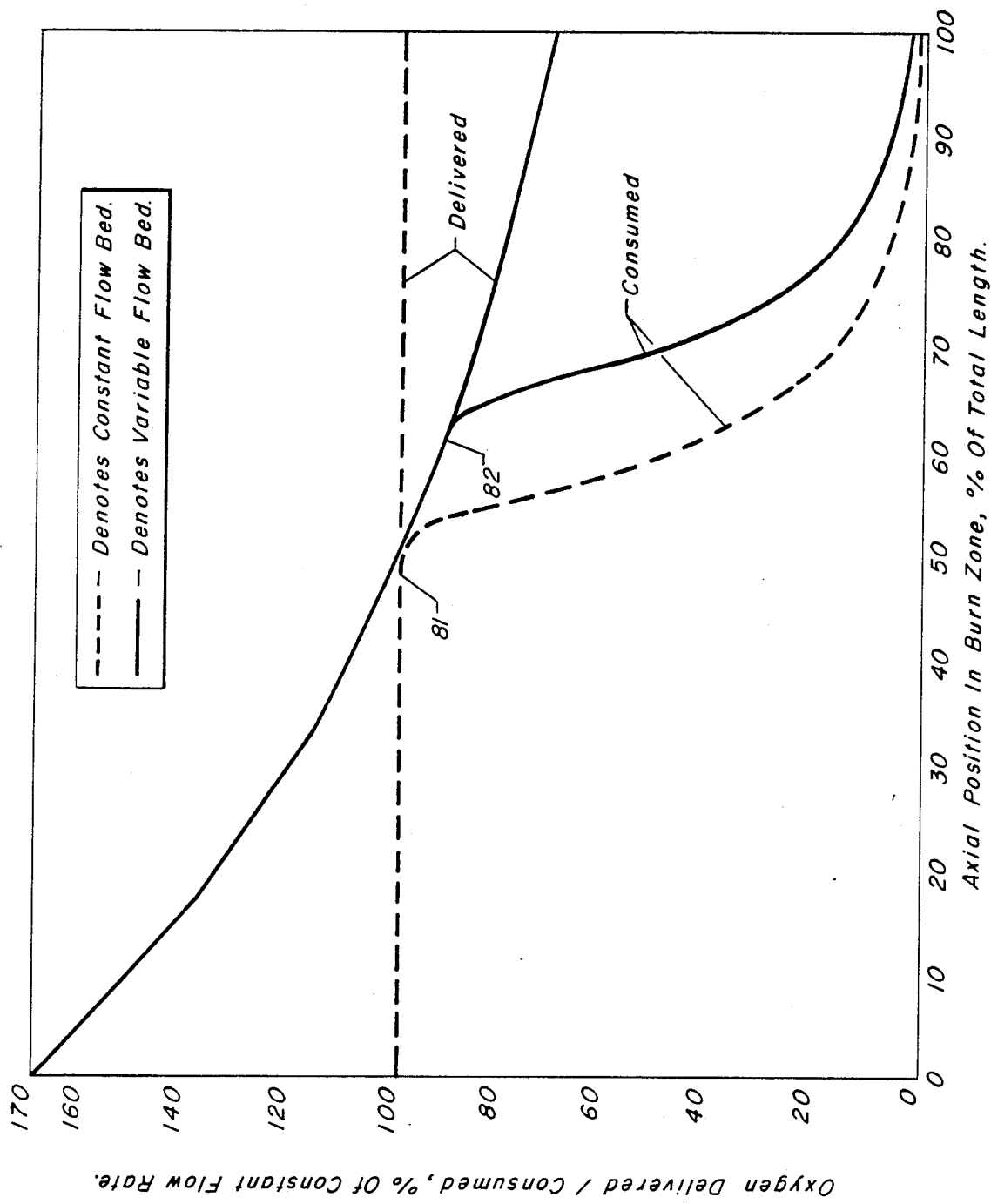

The curves of FIG. 5 shows oxygen delivered and oxygen consumed in a variable flow bed compared to a constant flow bed. The variable flow curves are approximate and not intended to provide precise values.

FIG. 6 depicts an annular-form catalyst bed confined between two cylindrical catalyst retention screens which are comprised of channel members and V-shaped wire.

FIG. 7 shows a portion of a catalyst retention screen of the type used in FIG. 6 in a flat configuration, before it is rolled to form a cylinder.

FIG. 8 is a top section view of a portion of the outer catalyst screen of FIG. 6.

FIG. 9 is a top section view of a portion of the inner catalyst retention screen of FIG. 6. FIG. 10 is a side section view of a portion of the inner catalyst retention screen of FIG. 6, taken as shown in FIG. 9.

FIG. 11 is a portion of a single channel member having two gas flow apertures which may be used in fabricating the screen of FIG. 6.

Figure 12:
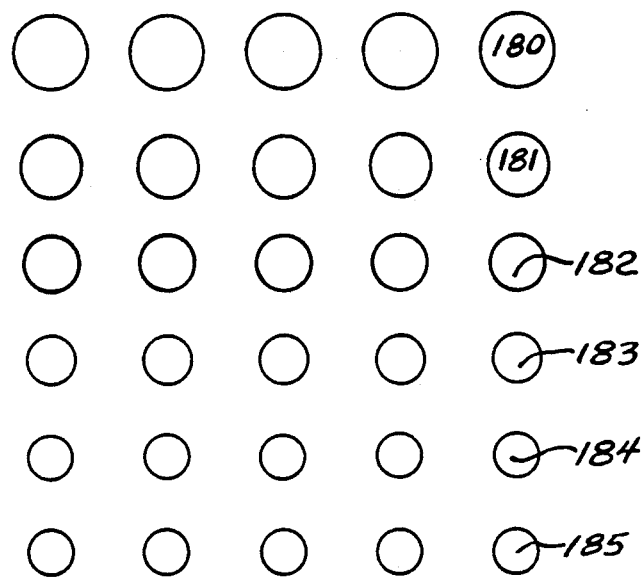

FIG. 12 is a front view of gas flow apertures in a portion of a flat screen which illustrates that the size of the apertures decreases with axial position, starting at the top of the screen.

DETAILED DESCRIPTION OF THE INVENTION

In the catalyst regeneration process of the present invention, catalyst is contacted with a hot oxygen-containing gas stream (known as recycle gas) in order to remove coke which accumulates on surfaces of the catalyst while it is in a hydrocarbon conversion reaction zone. Coke is comprised primarily of carbon but is also comprised of a relatively small quantity of hydrogen. The mechanism of coke removal is oxidation to carbon monoxide, carbon dioxide, and water. Coke content of spent catalyst may be as much as 20% of the catalyst weight but 5 to 7% is a more typical amount. After passing through a combustion zone, catalyst is passed into a drying zone for removal of water formed in the combustion zone which has remained on the catalyst instead of being carried off with combustion gases. Water removal is accomplished by passing a hot dry air stream through the catalyst. Catalyst is passed out of the regeneration vessel after drying is accomplished. The catalyst is usually subjected to additional treatment steps in order to complete the total regeneration process; an example of an additional step is contacting the catalyst with a gas comprised of hydrogen to effect reduction of the metal component.

A dry air stream is introduced into the bottom of the regeneration vessel and flows upward, countercurrent to catalyst flow. After passing through the catalyst drying zone to accomplish removal of water, the air stream passes into the gas collection portion of the combustion zone, where it mixes with the gas produced by combustion and gases which have passed through the catalyst. This mixture, termed flue gas, is withdrawn from the combustion zone and at least a portion of it is mixed with air and recycled back to the combustion zone to contact the catalyst to effect coke burn-off. The portion which is not recycled is simply vented to atmosphere. In an alternate method, the air stream leaving the drying zone will have a sufficient oxygen concentration, so that it is not necessary to add more air. In the regeneration of catalyst used in the hydrocarbon conversion reaction of catalytic reforming, an additional regeneration step may be necessary, as will be discussed below.

Figure 2:
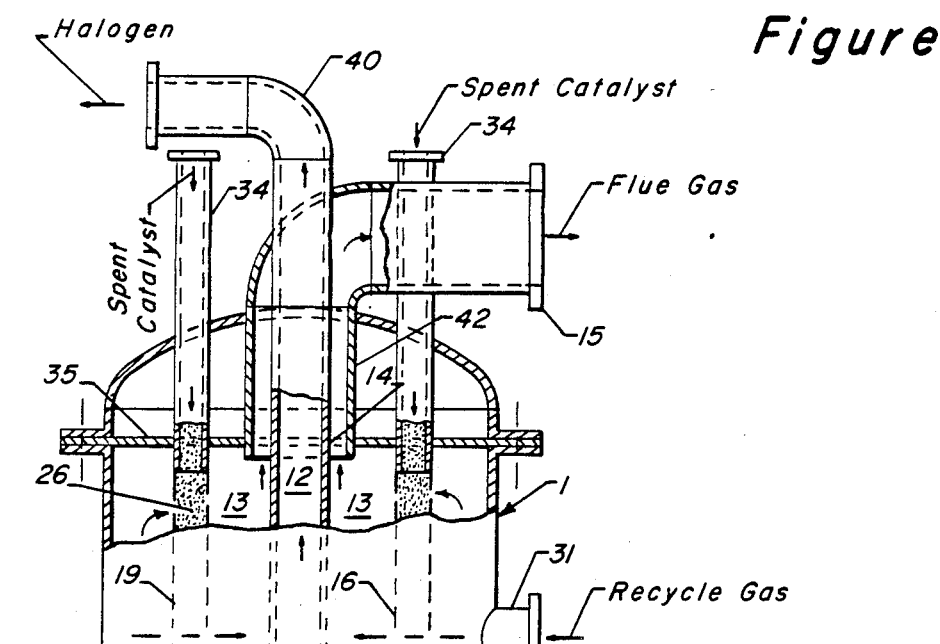
FIG. 2 is a schematic representation depicting in greater detail the regenerator of FIG. 1.
Figure 3:
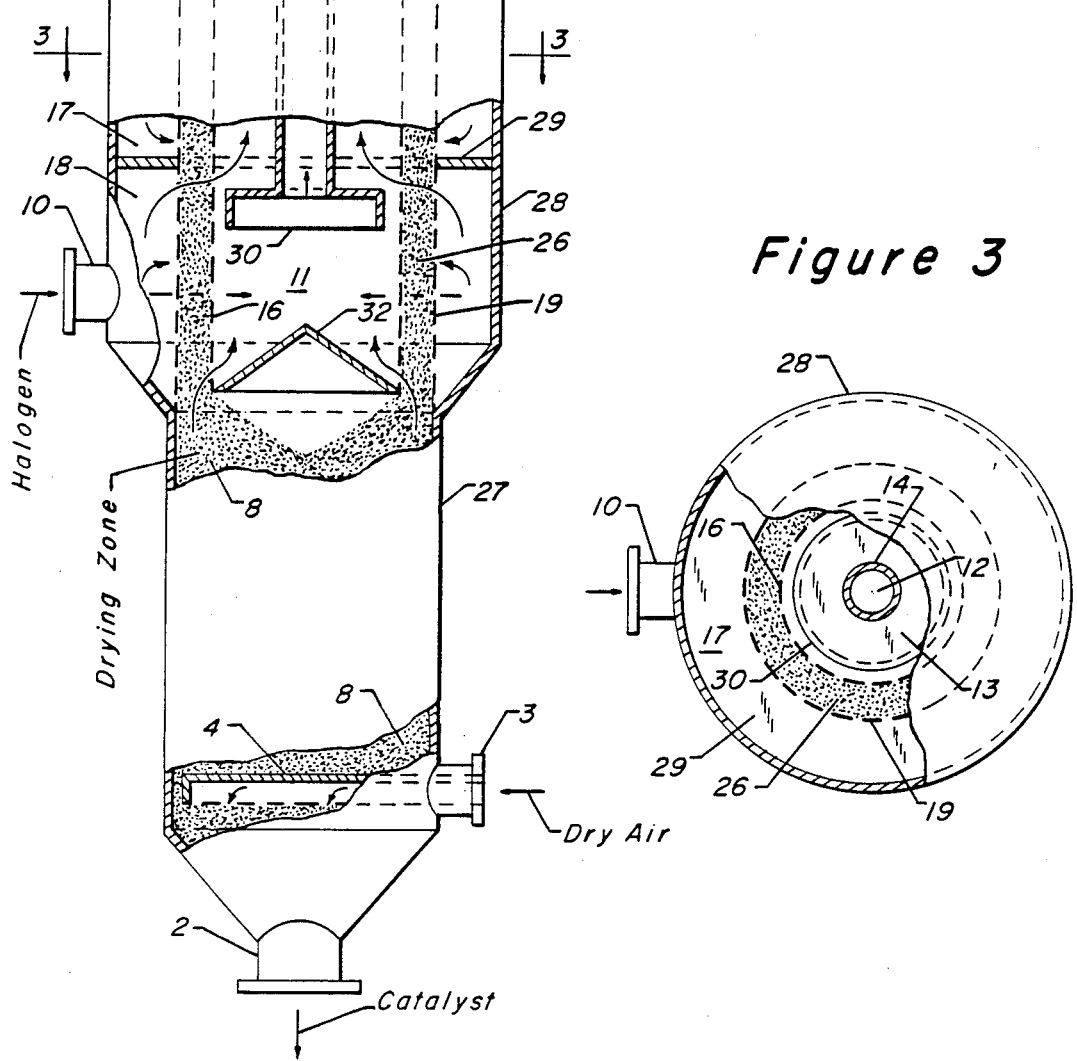
FIG. 3 is a top view in partial section taken as shown by the section line in FIG. 2. Certain elements not relevant to the present invention have been omitted from FIGS. 2 and 3; for example, flange bolting at the top head of the vessel is not shown.

In regeneration vessels, such as shown by FIGS. 2 and 3, where catalyst flows through a burn zone in an elongated constant flow bed and recycle gas is passed horizontally through the bed, the quantity of oxygen provided to each point on the leading surface of the bed remains constant, regardless of axial position of the point. A typical oxygen concentration in gas supplied to a burn zone is about 1% by volume. The concentration of oxygen at every point on the outer boundary, or the leading edge, of the catalyst bed, which is defined by the outer screen, is the same. More oxygen is consumed in the upper regions of the moving constant flow bed than in the lower regions. In the upper portion of the bed, gas exiting the bed contains no oxygen while in the lower portion of the bed only a portion of the oxygen passing through the bed is consumed. As mentioned above, this is an undesirable situation.

Practice of the present invention provides more oxygen to the portion of the catalyst bed where it is needed (the upper portion) and less oxygen to the portion of the bed where coke burning takes place at a relatively slow rate (lower portion). This is accomplished by varying the size of gas flow apertures in the catalyst retention screens, from a maximum size hole at the top of the burn zone to a minimum size hole at the bottom of the burn zone. This variation in aperture size causes the flow of recycle gas through the bed to vary from a maximum at the top to a minimum at the bottom of the bed. Increased utilization of oxygen and the resulting increased rate of coke burning permits the rate at which catalyst is passed through the bed to be increased without changing the amount of coke remaining on the catalyst leaving the burn zone. The blower which provides recycle gas to the burn zone does not have to be increased in size in order to practice the invention and achieve a higher rate of coke removal.

Figure 1:
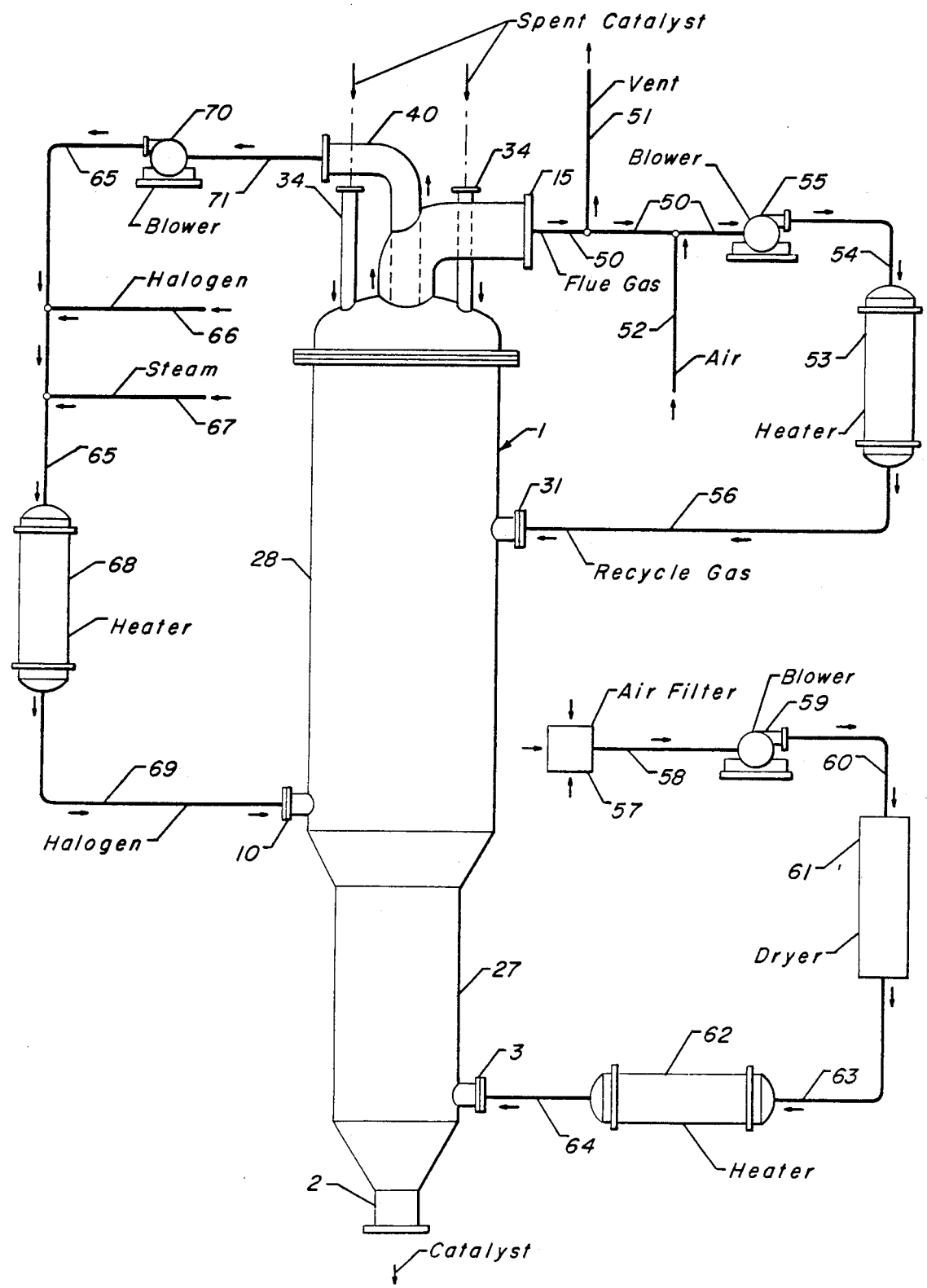
FIG. 1 depicts a catalyst regeneration vessel and associated equipment which may be used in a catalyst regeneration process.

FIGS. 1 through 3 will now be utilized in describing a specific example of the invention; such use is not intended to limit the broad scope of the invention as presented in the claims. The Drawings show only elements and equipment which are essential to a clear understanding of the invention. Application and use of additional required items is well within the purview of one skilled in the art. U.S. Pat. Nos. 3,652,231, 3,647,680 and 3,692,496, which have been made a part of this document, may be consulted for additional detailed information.

Referring now to FIG. 1, spent catalyst particles are introduced into regeneration vessel 1 by means of nozzles 34. Though two catalyst inlet nozzles are shown, only one nozzle or multiple nozzles may be utilized. Catalyst is removed from regenerator 1 at the lower end through nozzle 2. Regenerator 1 has an upper section 28 and a lower section 27.

Flue gas leaves the upper section of the regeneration vessel through nozzle 15 and is conveyed to blower 55 by means of pipeline 50. A portion of the flue gas leaving the regenerator is vented from the system by means of pipeline 51. Air is added to the flue gas by means of pipeline 52. The gas stream may now be denoted "recycle gas". Recycle gas leaving blower 55 by means of pipeline 54 passes through heat exchanger 53 and pipeline 56 to enter the regenerator by means of nozzle 31. Heat exchanger 53 heats the recycle gas to carbon-burning temperatures.

FIG. 1 depicts a halogenation loop. As mentioned above, not all catalysts require a halogenation step as part of the regeneration process. A halogenation gas stream is provided to the halogenation section of the regenerator by means of nozzle 10. The halogenation gas exits the regenerator by means of nozzle 40 and is conveyed to heat exchanger 68 by pipelines 72 and 65 and by blower 70. Steam is added to the halogenation gas by means of pipeline 67. Makeup halogen is added through pipeline 66. After the halogenation gas is heated, it passes through pipeline 60 to regenerator upper section 28.

Air drawn from the atmosphere by blower 59 passes through air filter 57 and is conveyed to blower 59 by pipeline 58. The air stream passes from the blower to air dryer 61 by means of pipeline 60. After water is removed from the air stream in dryer 61, the air stream flows to heater 62 by means of pipeline 63. The air stream is heated in heater 62 and passed into lower regenerator section 27 via pipeline 64 and nozzle 3.

Referring now to FIG. 2, which shows the regenerator of FIG. 1 in greater detail and uses reference numbers from FIG. 1 where appropriate, there are two catalyst retention screens 16 and 19 within the upper section 28 of regeneration vessel 1. Each of the screens is cylindrical in form. The screens are represented by dashed lines; examples of particular types of screens are discussed in the following pages.

The two catalyst retention screen have as their common central axis the central axis of the regeneration vessel and are concentrically disposed in the upper section of the regeneration vessel. Screens 16 and 19 form a catalyst retention space through which a descending annular column 26, or bed 26, of catalyst moves by gravity. Catalyst inlet conduits which are downward extensions of nozzles 34 deliver catalyst at points spaced around the annular bed. The catalyst screens have openings sufficiently small to preclude catalyst particles form passing through the screens. The catalyst retention screens extend throughout the upper section of vessel 1 and deliver catalyst to the lower section 27 of regenerator 1.

The portion of the upper section of vessel 1 which is above partition 29 is termed the burn zone, or combustion zone, where combustion of coke takes place. An annular-form space which serves to distribute recycle gas around the catalyst bed is formed between catalyst retention screen 19 and the sidewall of the upper section 28 of regeneration vessel 1 and is divided into two parts by partition 29. Recycle gas enters the uppermost gas distribution space, denoted by reference number 17, by means of recycle gas nozzle 31. Partition 29 forms a barrier between recycle gas distribution space 17 and a similar space which is denoted halogenation gas distribution space 18. Partition 35 provides a top closure for recycle gas distribution space 17. Recycle gas flows radially, or horizontally, from gas distribution 17 through the catalyst retained between screens 16 and 19 to a cylinder central space 13, a portion of which is occupied by halogen conduit 14. A lower boundary for central space 13 is provided by end portion 30 of conduit 14. Partition 35 constitutes a top closure for central space 13 as well as gas distribution space 17. Conduits 42 and 14 and the catalyst delivery conduits 34 pass through partition 35. Central space 13 is termed flue gas collection space. Conduit 42 is an extension of nozzle 15 within the vessel and conduit 42 is in communication with gas collection space 13. Conduit 14, which is an extension of nozzle, 40, passes through conduit 14 and collection space 13 but is not in communication with either.

The portion of upper regenerator section 28 which extends below partition 29 is termed the halogenation zone. A gas comprising a halogen enters the zone via halogenation nozzle 10, flows into halogenation gas distribution space 18, and then flows through the catalyst in a radial manner, entering halogenation zone central space 11. In certain applications, it is not necessary to utilize a halogenation zone and partition 29, halogen inlet nozzle 10, halogen outlet nozzle 40, and halogen outlet conduit 14 are omitted. Partition 29 is the top boundary of distribution space 18 and the lower boundary is formed by the necked-down portion of the regenerator at the bottom of upper section 28. End portion 30 of conduit 14 forms the upper boundary and end closure 32 forms the lower boundary of collection space 11.

Screen 19 extends into the lower section 27 of vessel 1, which is of a smaller diameter than the upper section, as can be seen in FIG. 2. The outside diameter of screen 19 at its lower end is slightly smaller than the inside diameter of the chamber lower section and the screen projects a short distance into the lower section. Catalyst discharged from the annular space between the catalyst retention screens fills all of lower section 27 of vessel 1. Catalyst moves downward through the lower section of the vessel and out of the vessel by means of catalyst outlet nozzle 2.

Nozzle 3 on regeneration vessel 1 is equipped with means for distributing air 4 to various points in a horizontal plane which is perpendicular to the descending catalyst, so that air will flow uniformly up the column in contact with all of the catalyst 8 in lower section 27, which may be denoted the drying zone. The means for distributing air depicted in FIG. 2 is a perforated pipe extending into the vessel via nozzle 3 and held in place by a flange bolted to the flange of nozzle 3. A more elaborate arrangement of perforated pipes may be used or other means for distributing air may be used.

Air entering the vessel via distributor 4 has been dried so that it contains no more than about 5 parts per million (by volume) of water and has also been heated. The hot air passes upwardly through the catalyst located in the drying zone, removing moisture which is contained on the catalyst. Essentially all of the air moving up the column lower section passes into the central space enclosed by catalyst retention screen 16 which is denoted halogenation gas collection space 11. The air stream from the drying zone mixes with gas which has passed through the catalyst from distribution space 18 to collection space 11 and the combined stream enters halogen conduit 14 to flow out of the regeneration vessel via halogen nozzle 40. The vessel is designed so that substantially all of the gas in central space 11 enters conduit 14. This is accomplished by providing flow directing means, such as the enlarged end portion of conduit 14 which is denoted by reference number 30. By substantially is meant between 80 and 100% of the air entering central space 11.

FIG. 3 is a top section view of vessel 1, taken as shown in FIG. 2. Halogen conduit 14 is centered on the vertical axis of the vessel. Catalyst retention screens 16 and 19 enclose the downward moving bed of catalyst 26. Gas in gas distribution space 17 flows radially through the catalyst to the central space 13 which is defined by screen 16 and also contains conduit 14. The interior of conduit 14 is denoted by reference number 12. End portion 30 of conduit 14 can also be seen in this view.

a portion of halogenation gas which passes through the bed in the halogenation zone enters central space 13, since the end portion 30 of conduit 14 is located below partition 29 (see FIG. 2). Gas passing through the catalyst in the burn zone provides the oxygen for combustion of carbon on catalyst in the burn zone and then mixes with the portion of upwardly flowing gas from the halogenation zone that did not enter conduit 14 and the mixture flows out of the vessel by means of nozzle 15.

The amount of oxygen delivered and consumed in both a constant flow bed and a variable flow bed is shown by FIG. 5. For reasons of drawing convenience, the curves for the variable flow bed are approximate and not intended to provide precise numerical values. The catalyst retention screens (reference numbers 16 and 19) of FIGS. 2 and 3 are represented by dashed lines; these Figures may be used to depict both types of bed. Referring to FIG. 5, the difference between the constant flow bed and the variable flow bed of the present invention lies solely in the configuration of the catalyst retention screens. Gas flow apertures of the screens of a variable flow bed are sized and located in order to cause the gas flow through the bed to vary with axial position (starting at the top of the vertically-elongated bed), while the screens of a constant flow bed are designed to yield a gas flux which is the same at any point on the leading edge of the bed. In the example from which FIG. 5 is drawn, in each case the catalyst bed has a horizontal thickness of approximately 6 inches (15.2 cm) and is annular in form, the catalyst being retained between a cylindrical inner screen and a cylindrical outer screen. The thickness of the bed is measured in a direction transverse to the direction of catalyst flow.

The rate of catalyst movement through a 6 inch bed may range from as little as 200 pounds per hour (90.7 kg) to 1000 pounds per hour (453.6 kg) or more. Typical bed lengths for this range of catalyst flow rate are from about 4 feet (1.22 m) to about 20 feet (6.1 m). The diameter of the inner catalyst retention screen at the top will often be in excess of 36 inches (0.91 m), in order to accommodate a 36 inch flue gas pipe. Where greater catalyst movement rates are required, bed thickness may be increased. For example, for a 2000 pound per hour (907.2 kg) catalyst flow rate, a bed may be 9 inches (22.86 cm) thick and bed length will be about 13 feet (51.5 m).

The amount of oxygen delivered to every point on the leading edge of the constant flow bed is the same; therefore, plotting the rate of oxygen delivery versus the location of delivery along the length (vertical) of the bed yields the dashed horizontal line of FIG. 5. It is implicit in this plot that rate of delivery at any point around the circumference at the same axial position is the same. The total amount of oxygen delivered in a unit of time is represented by the area under the horizontal dashed line extending from the top of the burn zone at the vertical axis to the bottom of the burn zone at the 100% location on the horizontal axis. The leading edge of the bed refers to the catalyst rather than to the screen and is the cylindrical exterior surface of the catalyst which is first contacted by recycle gas flowing through the bed. The leading edge of a screen is similarly defined. The gas flux at the leading edge, or the flow rate of gas into the bed, is substantially the same at every point because (1) the bed thickness is uniform, (2) the pressure drop for gas flowing from the inlet nozzle to every point on the leading edge of the outer screen is small, compared to the pressure drop for gas flowing through the screens and the bed, (3) the pressure drop for gas flowing through the outer screen is a constant for any unit area of the screen, (4) the pressure drop for gas flowing through the inner screen is a constant for any unit area of the screen, and (5) the pressure drop for gas flowing from every point on the downstream side of the inner screen to the outlet conduit is small, compared to the pressure drop for gas flowing through the screens and the bed.

All of the oxygen supplied to an upper region of the constant flow bed is consumed, since an abundant amount of coke is present. As catalyst particles move downward in the bed and coke is removed from them, a point is reached where less than all of the oxygen delivered is consumed. This is termed the breakthrough point and is shown by reference number 81 for the constant flow bed. Breakthrough occurs at a location spaced from the top of the bed by a distance of about 48.5% of the total length of the bed. It is known to those skilled in the art that catalyst particles of the type used in the hydrocarbon conversion processes of this invention have a large surface area, which results from the existence of a multiplicity of pores. When the catalyst particles reach the breakthrough point in the bed, the coke left on the surface of the particles is deep within the pores and, therefore, the oxidation reaction occurs at a much slower rate. This is illustrated by the portion of the curve (for oxygen consumed in the constant flow bed) to the right of the breakthrough point which rapidly falls off and then asymptotically approaches zero rate of oxygen consumed. The amount of oxygen consumed (in a unit of time) after the breakthrough point is but a fraction of that consumed (in a unit of time) in the bed above the breakthrough point, as can be seen by comparing areas under the curved. The area between the two dashed lines depicts the amount wasted in a unit of time. It can be seen that a significant amount of the oxygen delivered to the constant flow bed is not consumed and is therefore wasted.

The coke content of catalyst exiting the bed is approximately 0.2% of the weight of the catalyst. Much of this residual coke is burned off in the halogenation zone or, if the halogenation zone is omitted, in the drying zone. Were catalyst leaving the burn zone to have on it a larger amount of coke, the temperature in the zone below the burn zone would rise to an unacceptably high value, as a result of the heat of combustion. There is no significant difference in pressure drop through coked catalyst as compared to fresh catalyst.

Referring now to the curved of FIG. 5 which deal with the variable flow bed, it can be seen that the amount of gas flowing through the bed is at a maximum at the top of the bed and a minimum at the bottom of the bed. This is shown by the oxygen delivery curve for the variable flow bed. Oxygen delivered at the very top of the bed is 170% of the amount delivered to a constant flow bed. The rate of oxygen delivery decreases over the length of the bed, equalling the rate of delivery to a constant width bed at about the 50% point, that is, about halfway down the bed from the top. There is no significance to the location of this crossover point being near the breakthrough point for the constant flow bed. At the bottom of the variable flow bed, the oxygen delivered is about 72% of that delivered to a constant flow bed. It must be noted that a maximum permissible gas flow exists for each particular bed configuration. This is the gas flow rate where a further increase in gas flow causes catalyst particles to be pinned to the screen, thereby hindering catalyst flow.

Compared to the constant flow bed, the driving force for the combustion reaction in the variable flow bed is greater in the top portion of the tapered bed, since the amount of oxygen supplied is greater. In the lower portion of a variable flow bed, the driving force is less, since the amount of oxygen supplied is less. However, since combustion takes place at a much lower rate in the lower portion of the bed, the available oxygen is not a limiting factor.

Reference number 82 denotes the breakthrough point for the variable flow bed. At that point, the oxygen consumed begins to diverge from the oxygen delivered. The oxygen breakthrough point is located much further down the length of the variable flow bed than it is for the constant width bed; about 62%, compared to 48.5%. The increased amount of oxygen used in the variable flow bed and thus the increased amount of coke burned is easily seen by noting the difference in areas under the two curved for oxygen consumed. Also, the amount of oxygen supplied to the variable bed but not used is represented by the area between the solid-line curves to the left of breakthrough point 82. That the amount of oxygen which passes unused through the constant flow bed is greater is illustrated by the curves for the variable flow bed being contained totally within the dashed-line curves left of constant flow bed breakthrough point 81, the area between the dashed-line curves representing unused oxygen. The amount of oxygen wasted may be reduced further by further adjusting the sizes and locations of gas flow apertures; the variable flow curves of FIG. 5 do not represent an optimized configuration.

There are numerous types of catalyst retention screens. Wire cloth may be used. This is available in numerous combinations of wire size, opening size, and type of weave. More than one type of wire cloth is needed to fabricate a variable flow screen. Perforated plate may be used to confine catalyst particles. FIG. 12, which is discussed in detail below, depicts a portion of flat perforated plate. Perforated plate may serve as a flat catalyst retention screen or may be rolled and welded to form a cylindrical retention screen.

For use with very small catalyst particles, such as those used in a catalytic reforming process, a screen comprised of V-shaped wire welded to support members is preferred. U.S. Pat. Nos. 2,046,458 (cited above) and 3,652,231 (cited above) may be consulted for information on this type of screen. In construction a variable flow catalyst retention screen of V-shaped wire, the area for gas flow provided by the slots may be varied. Slots are the openings between the wires. Alternatively, slot area may be kept constant and the wire may be supported on, or wrapped around, a cylinder of perforated plate with gas flow apertures of varying size. To minimize catalyst attrition, it is desirable that the wires be vertically oriented, as shown in FIG. 6.

FIGs. 6 through 11 show a type of screen which is especially adapted for use with the present invention. U.S. Pat. Nos. 4,096,911 (cited above) and 4,276,265 (cited above) may be consulted for detailed information on this type of screen. Briefly, this screen is fabricated using V-shaped wire and the structural members known as channels. This type of screen may be referred to as channel-rod screen; the channels replace the support rods shown in the U.S. patents cited in the immediately preceding paragraph. FIG. 11 depicts a single channel having two gas flow apertures. FIG. 6 depicts a top portion of a catalyst bed retained between channel-rod screen. Catalyst particles 116 are confined between inner screen 115 and outer screen 117. FIG. 8 is a top sectional view of a portion of the outer screen of FIG. 6. FIG. 8 is a top sectional view of a portion of the inner screen of FIG. 6. Neither top section view shows gas flow apertures. For reasons of drawing convenience, the V-shaped wires shown in FIGS. 8 and 9 are not crosshatched. FIG. 10 is a side sectional view of the inner screen, taken as shown in FIG. 9. FIG. 7 shows a portion of flat channel-rod screen, which may be rolled and welded to form inner screen 115 or outer screen 117.

Reference numbers have been used in more than one of the figures where appropriate to facilitate drawing comprehension. Gas flow aperture 126 is typical of those depicted in outer screen 117. Gas flow apertures 134 of the inner screen may be seen in FIG. 6, FIG. 10, and FIG. 11. Reference number 122 denotes the uppermost channel of the outer screen (FIGS. 6 and 8). V-shaped wire of the outer screen is denoted by reference number 112 and may be seen in FIG. 6 and 8. V-shaped wire of the inner screen is denoted by reference number 112 and may be seen in FIGS. 6, 7, 9, and 10. The faces of the V-shaped wires which are toward the catalyst bed are denoted by reference numbers 120 and 128. Reference numbers 124 and 132 denote the slots between each V-shaped wire. The uppermost channel 130 of the inner screen may be seen in FIGS. 6, 9, and 11. The uppermost channel of the outer screen is denoted by reference number 122 and may be seen in FIG. 6 and 8. Channel 113 is adjacent to and below the uppermost channel of the outer screen.

Gas flows into the channels through gas flow apertures 126 and then through slots 124 to enter the catalyst bed. Gas which enters the space enclosed by a single channel and the V-shaped wires which are fastened to the channel flows within the channel in a horizontal and circumferential manner so that the flow out of the channel is substantially uniform. The gas flow space enclosed by a particular channel does not communicate with that enclosed by any other channel.

Gas exiting the bed flows through inner screen slots 132 and enters the spaces enclosed by the channels of the inner screen. It flows in the inner channel spaces to gas flow apertures 134. Gas flowing through the inner screen gas flow apertures enters gas collection space 13 of FIG. 2.

The sizes of gas flow apertures 126 and 134 in the inner and outer screens may be varied to obtain the desired flow pattern through the bed. For example, the apertures of channel 122 of the outer screen may be the largest, with the apertures of channel 113 being slightly smaller, and the apertures of each of the other channels being slightly smaller than the channel above it, with the lowermost channel of the outer screen having the smallest apertures. The inner screen may then have apertures of uniform size. Alternatively, aperture size of the inner screen may be varied while the apertures in the outer screen are of a constant size. Or aperture size in both the inner screen and the outer screen may be varied. Further, aperture size may be kept constant while the number of apertures in each channel are varied. Those skilled in the art are capable of calculating gas flow rates for any combination of aperture size, aperture location, and slot area. It can be seen that the use of channel-rod screen provides a great deal of flexibility in establishing a variable gas flow through the catalyst bed.

Flat screens may be used to confine catalyst. FIG. 4 shows a portion of a regeneration vessel 83 in vertical section. Catalyst retention screens 84 and 86 each lie in a single plane. The two planes are disposed opposite to one another and parallel to one another. The view in FIG. 4 is of the edges of the screens. Recycle gas enters gas distribution space 89 through nozzle 87. Gas passes through the catalyst into gas collection space 90 and flue gas exits the regenerator through nozzle 88.

A flat screen may be of any of the screen types discussed above in reference to cylindrical screen. For example, FIG. 7 depicts a portion of flat screen. FIG. 12 depicts a portion of a flat screen which is comprised of perforated plate. Reference number 180 of FIG. 12 denotes a gas flow aperture which is located in the top row of apertures, or holes. The size of the apertures decreases along the length of the portion of the screen. Aperture size in the second row, typified by aperture 181, is less than that in the first row. In each of the next four rows, aperture size is progressively decreased, as shown by apertures 182, 183, 184, and 185. As mentioned above, a flat perforated plate may be rolled to form a cylinder containing rows of gas flow apertures.

As mentioned above, catalyst temperatures which are commonly employed vary widely. A typical catalyst temperature at the top of a burn zone is about 890° F. (750K). It might rise to a peak of about 1100° F (866K) further down in the burn zone and start falling at the breakthrough point to a temperature in the range of about 900°-1000° F. (755-811K). The thickness of the catalyst bed, characteristics of the catalyst particles, screen configuration and gas flow rate are some of the factors which determine the pressure drop for gas flow through a particular bed and its retention screens. Commonly used total pressure drop across screens and beds typically range from 0.5 to 10 psi (3.4 to 68.9 kPa). In the practice of the present invention, total pressure drops over a bed and screens will usually be in the upper portion of the range and may, in certain cases be as large as twice the upper value of the range. Those skilled in the art will recognize that there are numerous variables to consider in selecting design and operating parameters.

A "screen", as used herein, is a member having openings through which gas will pass but sufficiently small that catalyst particles cannot pass through them. An "aperture", as used herein, is an area through which gas may flow.

That which is claimed is:

1. A method for effecting at least partial regeneration of spent catalyst particles used in hydrocarbon conversion reactions by removing coke deposits on said spent catalyst, said method comprising:
    (a) passing spent catalyst particles into the top of a vertically-elongated bed of catalyst particles, said bed having a uniform thickness and said catalyst particles being confined to form said bed by gas permeable sidewalls;
    (b) withdrawing catalyst particles from the bottom of the catalyst bed, thereby causing catalyst particles to move downward by gravity;
    (c) maintaining the bed of catalyst particles at coke-oxidizing temperatures; and,
    (d) combusting coke in said bed by passing an oxygen-containing gas through the catalyst bed in a direction substantially transverse to catalyst flow and in a non-uniform manner such that substantially all of the catalyst in the bed is in contact with flowing gas and the gas flow rate through the bed varies from a maximum at the top of the bed to a minimum at the bottom of the bed.

2. The method of claim 1 wherein said oxygen-containing gas is distributed across an inlet side of said gas permeable sidewalls and flow across said bed is made non-uniform by providing an increasing resistance to gas flow down the length of at least one gas permeable sidewall.

3. The method of claim 1 wherein the variation in said non-uniform gas flow varies continuously from the top of the bed to the bottom of the bed.

4. The method of claim 3 wherein a middle portion of the bed has a gas flow rate equal to the average gas flow rate produced by a uniform dispersion of the oxygen-containing gas across said bed.

5. The method of claim 1 wherein contact with said oxygen-containing gas reduces the coke content of said catalyst particles to less than 0.2 wt. %.

6. The method of claim 1 wherein all of the oxygen entering the upper half of said catalyst bed is consumed therein.

7. The method of claim 1 wherein said catalyst comprises a refractory inorganic oxide, at least one Group VIII noble metal and a halogen compound.

8. The process of claim 7 wherein said refractory inorganic oxide is alumina, said catalyst contains platinum and said halogen compound is chlorine.

9. The process of claim 1 wherein said catalyst particles are contacted with a halogen-containing gas in a halogenation zone after contact with said oxygen-containing gas.

10. The method of claim 9 wherein said catalyst particles pass from said halogenation zone to a drying zone and are contacted in said drying zone with a heated air stream.

* * * * *